(No Model.)
O. ZWIETUSCH.
APPARATUS FOR RECOVERING WASTE GASES IN BREWERIES.
No. 585,899. Patented July 6, 1897.
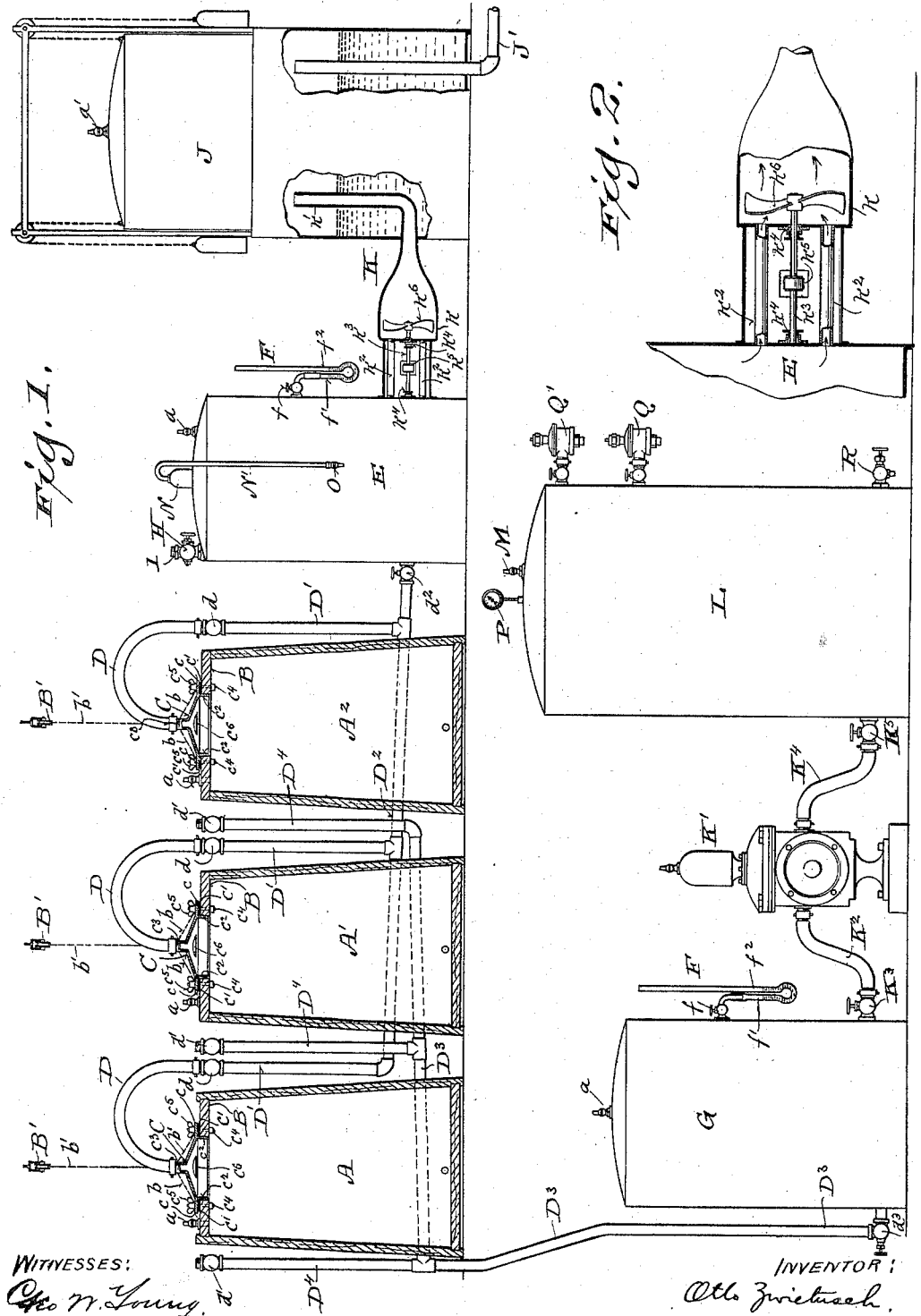
WITNESSES:
Geo. W. Young
B. C. Roloff
INVENTOR:
Otto Zwietusch
By H. G. Underwood
ATTORNEY

UNITED STATES PATENT OFFICE.

OTTO ZWIETUSCH, OF MILWAUKEE, WISCONSIN.

APPARATUS FOR RECOVERING WASTE GASES IN BREWERIES.

SPECIFICATION forming part of Letters Patent No. 585,899, dated July 6, 1897.

Application filed February 3, 1896. Serial No. 577,909. (No model.)

*To all whom it may concern:*

Be it known that I, OTTO ZWIETUSCH, a citizen of the United States, and a resident of Milwaukee, in the county of Milwaukee and State of Wisconsin, have invented certain new and useful Improvements in Apparatus for the Recovery of Waste Gases in Breweries; and I do hereby declare that the following is a full, clear, and exact description thereof.

My invention relates to the recovery and collection of the carbonic-acid gas produced in the fermenting-vats during the main fermentation of beer in a brewery; and it consists in the construction and arrangement of apparatus therefor, all as will be fully set forth hereinafter and subsequently claimed.

In the drawings, Figure 1 is a general view of my improved apparatus, the several parts thereof being arranged in proper relative positions for accomplishing the desired result, portions of said apparatus being broken away or shown partly in section to better illustrate certain details of construction. Fig. 2 is an enlarged detail view of a blower and connections forming part of said apparatus.

Heretofore the manufacture of lager-beer under the main fermentation has been ordinarily conducted in the following manner: After the wort has been brewed in the regular manner it is cooled and transferred to open vats, when the necessary stock-yeast for raising the fermentation is added. This is the so-called "main" fermentation and usually takes from ten to twenty days, depending mostly upon the temperature and the quality desired as to the product and other conditions. After the main fermentation is over the beer is stored in ruh or resting casks or vessels and finally prepared for the market by refermentation or carbonation. Unless these ordinary open fermenting-vats are filled with the fermenting beer close to the top there will be a layer of carbonic-acid gas above the liquid surface in the vat, the pressure of which retards the fermentation and very seriously when the said open vats are, say, only about half full of beer, as frequently happens.

It is one of the main objects of my present invention to hasten and improve the main fermentation by drawing off this layer of carbonic-acid gas from above the liquid surface in the vats and by the employment of closable vats, which may be made air-tight during the process of removing said gas, to produce a vacuum above the fermenting beer within the closed vat. This gas I draw off as fast as it is produced (employing either a blower, as shown in the drawings, or a pump or compressor for this purpose) and collect and store it in suitable vessels, and thus I not only hasten and improve the main fermentation, but I also recover a valuable and otherwise waste product for immediate or future use. This drawing off of the gas within the fermenting-vats unburdens the yeast layer spread upon the liquid surface within them, and by the production of a vacuum in the upper part of the closed vat the pressure is relieved entirely and the fermentation greatly facilitated.

Referring to the drawings, A A' A², Fig. 1, represent a series of closable fermenting-vats, each provided with a top B, which covers the greater part of said vat, but which is provided with a central opening adapted to be closed by the gas-collecting device C. This device C consists of a cover, shaped, preferably, like the frustum of a cone in its main part, which rises above the plane of the upper surface of the top B of the vat and having horizontal flanges $c$, with suitable rubber packing $c'$ on their under sides, which rest upon the said upper surface of the vat-top B, around the said central opening, and vertical downward-projecting continuous flanges $c^2$, fitting within and against the side walls of said opening. From the upper part of each gas-collecting device C there rises a neck or outlet $c^3$, to which is coupled one end of a (preferably flexible) pipe or tube D. The parts C are secured tightly to place over the said openings in the vat-tops by any suitable fastening devices, such as the screw-bolts $c^4$ and thumb-nuts $c^5$. These gas-collecting devices C are preferably provided with glass-covered observation-openings $c^6$ opposite each other, so that the progress of the fermentation may be seen without lifting up the said devices C. The tops B are provided with any desired number of air-cocks $a$. The combined covers and gas-collecting devices C, when not secured to the vat-tops, are suspended directly over the openings therein by means of cords or chains $b\ b'\ b'$, the main cords or chains $b'$ passing over sheaves or pulleys $B'$, as shown.

E represents a gas-collecting tank which may be of a size considerably less than that of the said vats and which may be located on the same floor therewith if more convenient, the size and location of this tank being immaterial, except that a large tank is not necessary. $D^2$ is a pipe leading into this tank E, and adjacent to its point of entrance said pipe is provided with a suitable valve $d^2$. From this pipe $D^2$ there rise branch pipes $D'$, one adjacent to each of the said fermenting-vats, said branch pipes being provided at their upper ends with screw-threads, by means of which the outer ends of the described pipes D, which lead from the gas-collecting devices C, may be coupled, as shown, there being suitable valves $d$ near the upper ends of said branch pipes $D'$.

$D^3$ is another pipe leading to another gas-collecting tank G and provided near its point of entrance with a valve $d^3$. From this pipe $D^3$ there rise a series of branch pipes $D^4$, (each having a valve $d'$ near its top,) screw-threaded at the upper end, so that, when desired, the outer ends of the pipes D may be uncoupled from the other branch pipes $D'$ and coupled to these branch pipes $D^4$.

Each of the described gas-collecting tanks E and G is preferably provided with a low-pressure and vacuum indicator F, comprising a doubled glass tube $f'\ f^2$, with colored liquid in the lower part thereof and a suitable valve $f$, adjacent to the point of connection of said indicator and the tank. Each of these tanks is provided with one or more air-cocks $a$ and the tank E with a domed extension N in its top, with communicating flexible pipe $N'$ leading therefrom and terminating in a try-cock O.

I is an outlet leading from the top of the tank E, and H a valve controlling the same.

The described low-pressure and vacuum indicator F and the domed extension N, with pipe $N'$ and try-cock O, are not herein claimed, as the same are shown, described, and claimed in my application, Serial No. 577,910, filed coincidently with this present application.

J represents a suitable gas-reservoir, the one shown being of the construction known as a "gasometer," and the gas collected in the tank E is conveyed thereto by any suitable device, that shown being a blower K, comprising a cylinder $k$, terminating at one end in a pipe $k'$ of reduced diameter, entering the reservoir or gasometer J, and being closed at its other end, except that it receives there the adjacent ends of pipes $k^2\ k^2$, leading from the tank E. A shaft $k^3$ is journaled in said tank E, and closed end of the cylinder $k$ (passing through stuffing-boxes $k^4\ k^4$) being provided with a driving-pulley $k^5$ outside of said cylinder and with a fan $k^6$ within the latter.

The gasometer J has an escape-cock $a'$ in the top of its vertically-movable counter-weighted upper part and an outlet-pipe $J'$ leading out through its lower part to a pump (not shown) to force the gas through a purifying device, (also not shown,) so as to fit it for use in carbonating the beer subsequently.

$K'$ is a pump or compressor located between the tank G and a gas-reservoir L, a pipe $k^2$ (having a valve $k^3$) leading from said tank G, and a pipe $k^4$ (having a valve $k^5$) leading to said reservoir L. Said reservoir is shown as having an air-cock M and pressure-gage P, regulating-valves Q Q', and a valve-controlled gas-outlet pipe R.

It will be understood that, if preferred in any given instance, a pump like $K'$ may be used in place of a blower like K, or vice versa, and, if preferred, a reservoir like L may be used in place of the gasometer J; but the arrangement of parts as shown will be found to work admirably in most instances.

In carrying out my process the wort is prepared in the usual way, and when cooled it is conveyed into an open tank or other vessel, where the required stock-yeast is added, just as formerly, and a current of fresh air admitted to start a lively fermentation; but instead of leaving the wort in an open vessel to there ferment for ten or twenty days I transfer the wort (if said vessel has no cover) in a day or two after the fermentation has set in to the described closable vats, leaving their covers open until no more atmospheric air is needed, (which may be a day or so, according to the condition of temperature, quantity of yeast added, &c.,) and then when the fermentation is in a satisfactory state of progress I close the covers tightly, leaving the outer ends of the flexible tubes D uncoupled from the described vertical branch pipes $D'$ or $D^4$ and open to the air until the pressure of the carbonic-acid gas generated by the fermentation within the closed vats begins to expel mixed gas and air through the said tubes D, and then I couple the latter to the vertical branch pipes $D^4$, which carries this mixed gas and air through the pipe $D^3$ into the tank G, from whence it is drawn off, as by the pump or compressor $K'$, into the reservoir L and stored there for subsequent use as a compelling-pressure in lieu of air-pressure in the subsequent brewing processes.

The flow of mixed air and gas usually continues for a day or two, and by opening the air-cocks $a$ of the several vats the flow can be tested, and as soon as it is determined that a practically clear gas is being produced the valves $d'$ of the branch pipes $D^4$ are closed and the flexible tubes D uncoupled from said branch pipes and coupled to the other vertical branch pipes $D'$, as shown in Fig. 1, the valves $d\ d\ d^2$ being opened, and then the gas escapes by its own pressure through the tubes D, branch pipes $D'$, and leading pipe $D^2$ into the tank E. In order to hasten this removal of the gas from the upper part of the fermenting-vats and lighten the pressure of said gas upon the liquid surface within said vats, I apply suction, as by the blower K, (or pump K', if that is used.) The gas thus sucked off passes through the tank and blower or pump to the gasometer or other reservoir, where if it is the clear gas from the tank E it is ready to be purified and used in carbonating the beer, and if it is the mixed gas and air collected in tank G it is, as before stated, ready for use as a substitute for the compressed air now in common use in breweries.

If desired, instead of first employing a separate open vessel or vessels for mixing the freshly-brewed wort with the stock-yeast I may put the wort directly into the described closable fermenting-vats and feed the stock-yeast thereto, obtaining the necessary air by keeping the tops or top-openings of said vats uncovered, as the process and result will be the same in either instance.

By the use of the peculiar vat-tops hereinbefore described I avoid the necessity of opening the entire vat when it is necessary to have access to the contents, as for the insertion of a thermometer or in the skimming of the upper surface when that is desirable, and hence I avoid that degree of interference with the fermentation consequent upon the removal of the entire vat-cover, as my described combined gas-collecting and closing device C occupies a space in the central part of the vat-cover proper, B, and said cover is not disturbed. Further than this the depending flange $c^2$ of the device C forms a guide in the proper seating of the same when the opening in the vat top or cover proper is being closed and prevents the rubber packing-ring $c'$ from being drawn or forced into said opening, the said packing-ring always remaining in its proper position beneath the horizontal annular flange $c$, so as to insure an air-tight closure when the device C is seated and fastened to place, as hereinbefore described.

Having thus described my invention, what I claim as new, and desire to secure by Letters Patent, is—

1. The combination of a fermenting-vat, with a permanently-closed cover having an opening therein, and a combined gas-collecting and closing device of conical form rising to a plane above that of the cover proper, and having a depending guide-flange fitting within the said opening in the vat-cover, a horizontal annular flange, a packing-ring beneath said last-named flange, and a gas-outlet leading from the top of said combined device.

2. The combination of a fermenting-vat having an opening in its top, of a conical combined gas-collecting and closing device having flanges tightly fitting within and above said opening, and a neck or outlet at its top, a suspension device for supporting the closing device above said opening, and fastening devices for securing said closing device tightly to said vat-top, and a gas-leading pipe or tube connected to said neck or outlet exterior to and above said vat-top.

3. The combination with a series of closable fermenting-vats, of a gas-collecting tank of less size than that of any of the said vats and arranged upon the same plane therewith, gas-leading pipes connecting said vats with said tank, a suitable gas-reservoir located beyond said collecting-tank, a cylinder terminating at one end in a pipe of reduced diameter entering the said reservoir and thence projecting upwardly therein, said cylinder being closed at its other end, pipes leading from the said collecting-tank and passing through the closed end of said cylinder, a stuffing-box in said closed cylinder end between said pipes, a shaft journaled in said tank and closed end of the cylinder and passing through the said stuffing-box, a fan on the inner end of said shaft within said cylinder, and a driving-pulley on said shaft exterior to said cylinder.

4. The combination with a series of closable fermenting-vats having gas-collecting devices connected to or forming part of the tops or covers thereof, of a gas-collecting tank of less size than that of any of said vats and arranged upon the same plane therewith, a gasometer located beyond said tank, a close-ended cylinder, containing a revolving fan forming a blower and communicating pipes interposed between and connecting said tank and gasometer, another small gas-collecting tank arranged upon a plane below that of said vats, a gas-reservoir located beyond said last-named tank, a pump or compressor and communicating pipes interposed between and connecting said tank and reservoir, separate pipes leading to each tank and each of said pipes having a series of valve-controlled branch pipes rising therefrom to a level with the tops of said vats, and adjacent thereto, and a series of flexible pipes or tubes, coupled to the said gas-collecting devices, and having their other ends provided with coupling devices for connection with the adjacent branch pipes of either of the described gas-leading pipes.

In testimony that I claim the foregoing I have hereunto set my hand, at Milwaukee, in the county of Milwaukee and State of Wisconsin, in the presence of two witnesses.

OTTO ZWIETUSCH.

Witnesses:
   H. G. UNDERWOOD,
   B. C. ROLOFF.